Patented Nov. 13, 1934

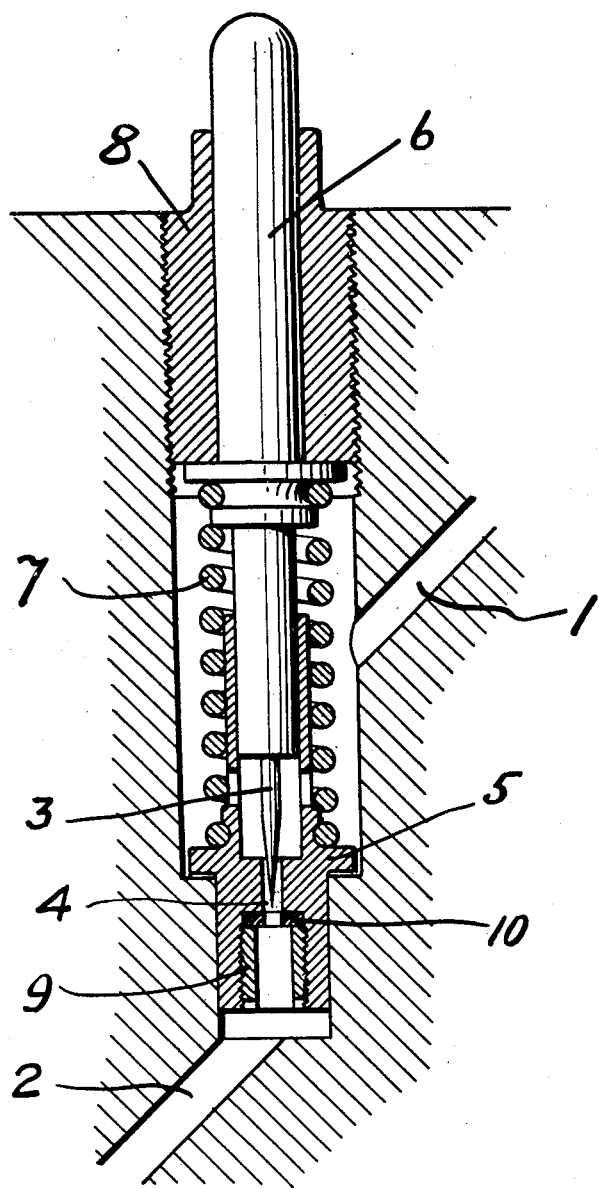

1,980,752

UNITED STATES PATENT OFFICE 1,980,752

REGULATOR FOR MILKING MACHINES

Sven August Eskilson, Stockholm, and Georg Karl Vilhelm Johanson, Lidingo, Sweden, assignors to Svenska Aktiebolaget Gasaccumulator, Stockholm-Lidingo, Sweden, a corporation of Sweden Application February 4, 1931, Serial No. 513,295
In Sweden March 4, 1930

8 Claims. (Cl. 251—137)

For generating the variations in the air-pressure by means of which the milking action of vacuum operated milking machines is effected, such machines are generally provided with so-called pulsators. The pulsators are usually operated by means of the difference of pressure existing between atmospheric pressure and the vacuum in the milk pails. The pulsators may be of very different types. A typical pulsator comprises a piston, membrane or the like which is moved to and fro, owing to the above-named difference of pressure, thereby alternately opening and closing pipes or channels so that the chamber between the shell of a teat cup and an elastic membrane contained therein is alternately connected with atmosphere and with the vacuum prevailing in the milk pails. The speed of the pulsation is regulated by means of throttling one or several of the channels through which air is streaming when the pulsators are in operation. Such speed regulators are simple and may be manufactured at a small cost, but they have the disadvantage that the speed of the pulsation soon changes owing to depositions of dust on the throttling surfaces, which reduces the throttling area and thus also changes the speed at which the pulsator operates. This is objectionable for several reasons. The cow will be irritated if it is milked in different ways. Such irritation has an influence on the secretion of the milk, and the speed at which the milking is being effected will be changed and will be reduced if the pulsation rate lowers too quickly. In the use of pulsators provided with the described regulating device, it has been common practice to instruct the operator to control the speed of the pulsation and, if it should be materially different from the normal speed, to adjust it by means of the regulating screw. Such instructions are, however, rarely followed, owing to the loss of time involved.

The present invention relates to a pulsator for a milking machine of the type referred to above, and is characterized by devices, connected with the pulsator, which normally make it possible to clean the throttling surface without adjusting the regulating organ and without disassembling the pulsator.

One embodiment of the invention is illustrated in the drawing, which is a longitudinal section through the regulator. 1 is a channel in connection with the atmosphere, 2 is a channel leading to one of the chambers of the pulsator. In the chamber between the channels 1 and 2 is a throttling contrivance comprising a needle 3 which partially projects into a hole or passage 4 positioned in the bushing 5. The needle 3 is fixed in a pin 6, which is movable in axial direction and, which by a spring 7, is pressed against a regulating screw 8 threaded into the housing of the pulsator. The bushing 5 beyond hole 4 has a boring, wider than said hole, in which is a sleeve-shaped screw 9. Between the bushing 5 and the screw 9 and beyond the hole 4 is an elastic disc 10, provided with a central hole which is somewhat smaller than the body of the needle 3.

The air which regulates the speed of the pulsations streams through the channel 1 and the throttled hole 4. During the passage dust is deposited on the needle 3 and on the surface in the hole 4. To remove the dust it is only necessary to move the pin 6 so that the needle 3 passes through the hole 4 and the elastic disc 10. When the needle passes through the disc, it is cleaned, after having removed from the walls of the hole any deposits thereon.

In the embodiment illustrated in the drawing the regulating needle occupies its normal operating position. While the bushing 5 has been described as fixed and the needle as adjustable, we do not wish to be limited to this arrangement. Any means for changing the relative positions of bushing and needle would be within the scope of the invention.

In the figure the pin 6 is fixed to a regulating screw 8 which can be screwed up and down so that the needle may occupy different positions relative to the hole 4. This adjustment is not absolutely required in connection with a pulsator provided with devices for cleaning the throttling surfaces, but is desirable, since the pulsator may then be easily adjusted by the manufacturer and may also be readjusted in the barn, if that should be found necessary.

In the foregoing description the regulating channel of the pulsator has been assumed to have only one point of throttling for the regulation of the speed. When working with a great difference of pressure it may, however, be preferable to provide several throttlings in the regulating channel in order to obtain a greater throughflow area. In such pulsators it is desirable to provide cleaning devices at each point of throttling. Such multiple throttles would involve mere duplication and therefor require no illustration or further description.

Having now fully described our invention, what we claim and desire to protect by Letters Patent is:

1. A regulator for milking machine pulsators comprising a member provided with an orifice forming an air flow passage, an elastic disc having an orifice registering with said air flow passage and a needle, the body of which is larger than the disc orifice, normally extending into and throttling the orifice in said member, said needle being movable by manual force axially within the orifice in said member and the orifice in said disc to thereby effect cleaning of the throttling surfaces of said needle and the orifice in said member.

2. A regulator for milking machine pulsators comprising a member provided with an orifice forming an air flow passage, an elastic disc having an orifice registering with said air flow passage and a needle, the body of which is larger than the disc orifice, normally extending into and throttling the orifice in said member, said needle being movable by manual force axially within the orifice in said member and the orifice in said disc and thereby effect cleaning of the throttling surfaces of said needle and the orifice in said member, and means to restore said needle to its initial relative position when said manual force is released.

3. A regulator for milking machine pulsators comprising a member provided with an orifice forming an air flow passage, an elastic disc having an orifice registering with said flow passage, and a needle, the body of which is larger than the disc orifice, extending into and throttling the orifice in said member, means to adjust the relative working positions of said member and needle, said needle being movable by manual force axially within the orifice in said member to enter the orifice in said disc to effect cleaning of the throttling surfaces of said needle and the orifice in said member, and a spring adapted, when said manual force is withdrawn, to restore said needle and hold it in its adjusted position.

4. A regulator for milking machine pulsators comprising a member having an air passage, an elastic disc having an orifice registering with said air passage, a needle, the body of which is larger than the disc orifice, having a tapered end which is adjustable to normally extend a greater or less distance within, and thereby more or less throttle, said passage and which is manually movable beyond its adjusted position to be projected into the disc orifice and thereby effect cleaning of the throttling surface of the needle and passage.

5. A regulator for milking machine pulsators comprising a bushing provided with a regulating passage and having at one end a boring forming an internal shoulder at one end of the regulating passage, an elastic orificed disc seated against said shoulder, a hollow screw threaded in said boring and confining the orificed disc against said shoulder, and a needle, the body of which is larger than the disc orifice, normally extending into and throttling said passage, said needle being movable by manual force axially within said passage and into the orifice in the disc to thereby effect cleaning of the throttling surface of the needle and passage.

6. A regulator for milking machines comprising a housing enclosing a chamber, a screw threaded within the housing at one end of the chamber, a bushing at the other end of the chamber, said bushing having an air passage adapted to be throttled, a pin extending through said screw and into said chamber, a needle carried by the pin and having a tapered end extending into said passage, a flange on said pin, a spring between said bushing and flange and adapted to hold said flange against said screw, said screw being adjustable to regulate the normal position of the pin and thereby the degree to which the needle throttles said passage, and an elastic disc beyond said passage having an orifice smaller than the body of the needle, said pin being manually axially movable against the force of the spring, to project the tapered end of the needle into the orifice of the flexible disc and thereby clean the throttling surface of the needle and passage.

7. A regulator for milking machines for controlling the flow of air and thereby the speed of the pulsator, said regulator comprising an element having a passage, an element for throttling said passage, a resilient member adjacent one end of said passage and having an orifice smaller than said throttling element, manually operable means to adjust the relative position of said elements and predetermine the degree of throttling, manually operable means to move the throttling element relative to the other element and to said resilient member out of their so adjusted relation to clean the throttling surfaces, and independent means adapted to reposition said elements in their previously adjusted relation.

8. A regulator for milking machine pulsators for controlling flow of air and thereby the speed of the pulsator, said regulator comprising a member having a passage and a needle body having a reduced end for throttling said passage, manually operable means to adjust the relative positions of said elements and thereby predetermine the degree of throttling, manually operable means to move one of said elements relative to the other so far out of their so adjusted relation as to cause the body of the needle to enter said passage and to thereby effect cleaning of the passage and the body of the needle, and independent means to reposition said elements in their previously adjusted relation.

SVEN AUGUST ESKILSON.
GEORG KARL VILHELM JOHANSON.